US012567895B2

(12) United States Patent
Caporal Del Barrio et al.

(10) Patent No.: US 12,567,895 B2
(45) Date of Patent: Mar. 3, 2026

(54) BEAM FAILURE DETECTION AND RECOVERY IN WIRELESS COMMUNICATION NETWORKS

(71) Applicant: Nokia Technologies Oy, Espoo (FI)

(72) Inventors: Samantha Caporal Del Barrio, Aalborg (DK); Simon Svendsen, Aalborg (DK); Amir Mehdi Ahmadian Tehrani, Munich (DE); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 342 days.

(21) Appl. No.: 18/252,469

(22) PCT Filed: Nov. 18, 2021

(86) PCT No.: PCT/EP2021/082111

§ 371 (c)(1),
(2) Date: May 10, 2023

(87) PCT Pub. No.: WO2022/112086

PCT Pub. Date: Jun. 2, 2022

(65) Prior Publication Data

US 2023/0421274 A1 Dec. 28, 2023

(30) Foreign Application Priority Data

Nov. 25, 2020 (FI) .................................... 20206204

(51) Int. Cl.
| | |
|---|---|
| *H04B 7/06* | (2006.01) |
| *H04W 74/04* | (2009.01) |
| *H04W 74/0833* | (2024.01) |

(52) U.S. Cl.
CPC ........ *H04B 7/06964* (2023.05); *H04W 74/04* (2013.01); *H04W 74/0833* (2013.01)

(58) Field of Classification Search
CPC ...... H04B 7/04; H04B 7/0404; H04B 7/0408; H04B 7/063; H04B 7/065; H04B 7/06964; H04W 74/0833; H04W 74/0838
See application file for complete search history.

(56) References Cited

U.S. PATENT DOCUMENTS

2019/0110281 A1 4/2019 Zhou et al.
2019/0261289 A1 8/2019 Raghavan et al.
(Continued)

FOREIGN PATENT DOCUMENTS

| WO | 2020/221957 A2 | 11/2020 |
|---|---|---|
| WO | 2020/228934 A1 | 11/2020 |
| WO | 2021/259541 A1 | 12/2021 |

OTHER PUBLICATIONS

"3rd Generation Partnership Project; Technical Specification Group Radio Access Network; NR; Physical layer procedures for control (Release 16)", 3GPP TS 38.213, V16.3.0, Sep. 2020, pp. 1-179.
(Continued)

*Primary Examiner* — Pao Sinkantarakorn
(74) *Attorney, Agent, or Firm* — Barta Jones, PLLC

(57) ABSTRACT

According to an example aspect of the present invention, there is provided a method comprising, detecting a maximum permissible exposure event or that the maximum permissible exposure event is potential, determining at least one beam for a contention-free random access based beam failure recovery procedure, wherein the at least one beam is affected, or will be affected, by the maximum permissible exposure event and transmitting to a wireless network node at least one indication about the at least one beam.

11 Claims, 8 Drawing Sheets

710

Detect a maximum permissible exposure event or that the maximum permissible exposure event is potential

720

Determining at least one beam for a contention-free random access based beam failure recovery procedure, wherein the at least one beam is affected, or will be affected, by the maximum permissible exposure event

730

Transmitting to a wireless network node at least one indication about the at least one beam

(56) References Cited

U.S. PATENT DOCUMENTS

| | | | |
|---|---|---|---|
| 2020/0245198 A1 | 7/2020 | Nagaraja et al. | |
| 2020/0259703 A1 | 8/2020 | Cirik et al. | |
| 2020/0267662 A1 | 8/2020 | Godala et al. | |
| 2020/0322865 A1 | 10/2020 | Raghavan et al. | |
| 2021/0297959 A1* | 9/2021 | Zhou | H04W 72/0453 |
| 2021/0298084 A1* | 9/2021 | Taherzadeh Boroujeni | H04W 74/0833 |
| 2022/0322247 A1* | 10/2022 | Sun | H04W 52/42 |
| 2023/0022469 A1* | 1/2023 | Yuan | H04B 7/0695 |
| 2023/0144010 A1* | 5/2023 | Kwak | H04L 5/0051 370/329 |

OTHER PUBLICATIONS

"3rd Generation Partnership Project; Technical Specification Group Radio Access Network; NR; Physical layer procedures for data (Release 16)", 3GPP TS 38.214, V16.3.0, Sep. 2020, pp. 1-166.

"3rd Generation Partnership Project; Technical Specification Group Radio Access Network; NR; Requirements for support of radio resource management (Release 16)", 3GPP TS 38.133, V16.5.0, Sep. 2020, 1608 pages.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"Introduction of the P-MPR 2 bits report mapping in 38.133", 3GPP TSG-RAN WG4 Meeting #96-e, R4-2011736, InterDigital Inc, Aug. 17-Aug. 28, 2020, 2 pages.

"Introduction of MPE related P-MPR operation in sub-clause 6.2. 4", 3GPP TSG-RAN WG4 Meeting #96-e, R4-2011735, InterDigital Inc, Aug. 17-Aug. 28, 2020, 3 pages.

"3rd Generation Partnership Project; Technical Specification Group Radio Access Network; NR; User Equipment (UE) radio transmission and reception; Part 2: Range 2 Standalone (Release 16)", 3GPP TS 38.101-2, V16.5.0, Sep. 2020, pp. 1-181.

"Introduction of MPE reporting", 3GPP RAN WG2 Meeting #111-e, R2-2008595, InterDigital, Aug. 17-Aug. 28, 2020, 6 pages.

"Introduction of MPE reporting", 3GPP RAN WG2 Meeting #111-e, R2-2008570, InterDigital, Aug. 17-Aug. 28, 2020, 9 pages.

"KT PyeongChang 5G Special Interest Group (KT 5G-SIG); KT 5th Generation Radio Access; Medium Access Control (MAC); Protocol specification (Release 1)", TS 5G.321, V1.2, Sep. 2016, pp. 1-42.

Office action received for corresponding Finnish Patent Application No. 20206204, dated Mar. 9, 2021, 11 pages.

"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.

"Panel-based UL beam selection", 3GPP TSG RAN WG1 Ad-Hoc Meeting 1901, R1-1900844, Agenda: 7.2.8.6, Huawei, Jan. 21-25, 2019, 6 pages.

"Enhancements on Multi-beam Operation", 3GPP TSG-RAN WG1 Meeting #98, R1-1909273, Agenda: 7.2.8.3, Qualcomm Incorporated, Aug. 26-30, 2019, pp. 1-20.

Office action received for corresponding Finnish Patent Application No. 20206204, dated Oct. 5, 2021, 8 pages.

International Search Report and Written Opinion received for corresponding Patent Cooperation Treaty Application No. PCT/EP2021/082111, dated Mar. 14, 2022, 21 pages.

"Discussion on multi-beam operation", 3GPP TSG RAN WG1 #103-e, R1-2009174, Agenda: 8.1.1, NTT Docomo Inc, Oct. 26-Nov. 13, 2020, 22 pages.

"On Beam Management Overhead and Latency Reduction", 3GPP TSG RAN WG1 Meeting #94, R1-1808719, Agenda: 7.2.8, Intel Corporation, Aug. 20-24, 2018, 5 pages.

* cited by examiner

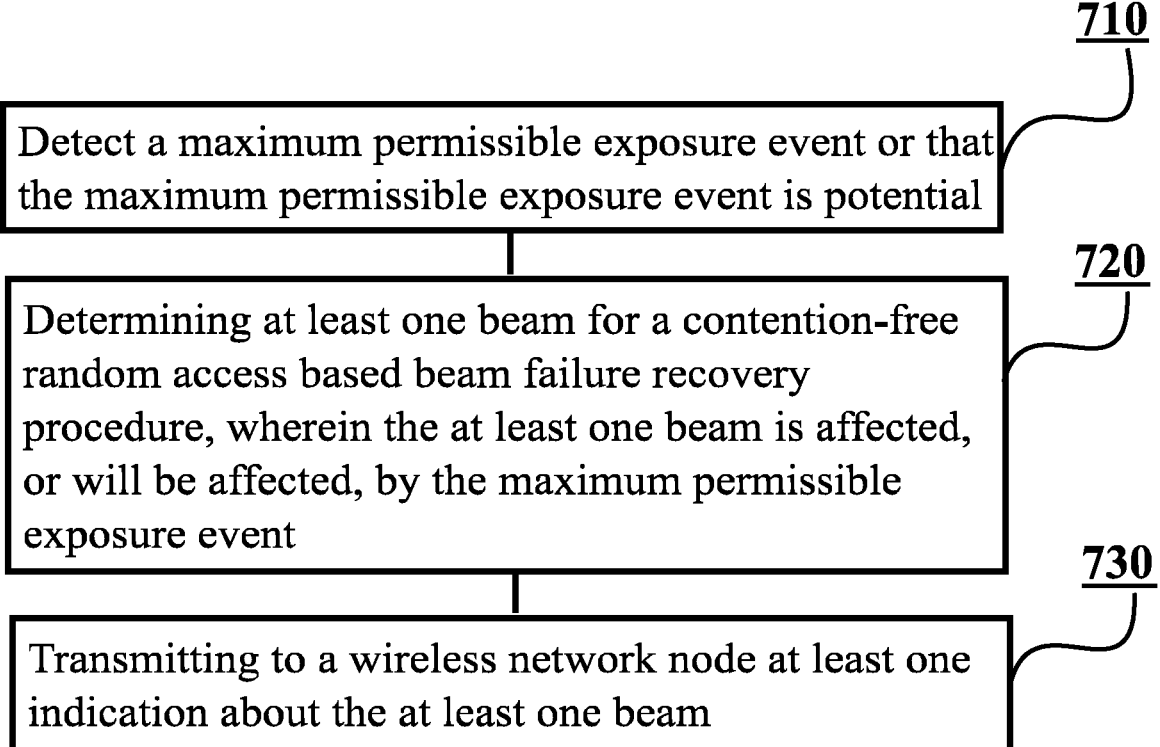

710

Detect a maximum permissible exposure event or that the maximum permissible exposure event is potential

720

Determining at least one beam for a contention-free random access based beam failure recovery procedure, wherein the at least one beam is affected, or will be affected, by the maximum permissible exposure event

730

Transmitting to a wireless network node at least one indication about the at least one beam

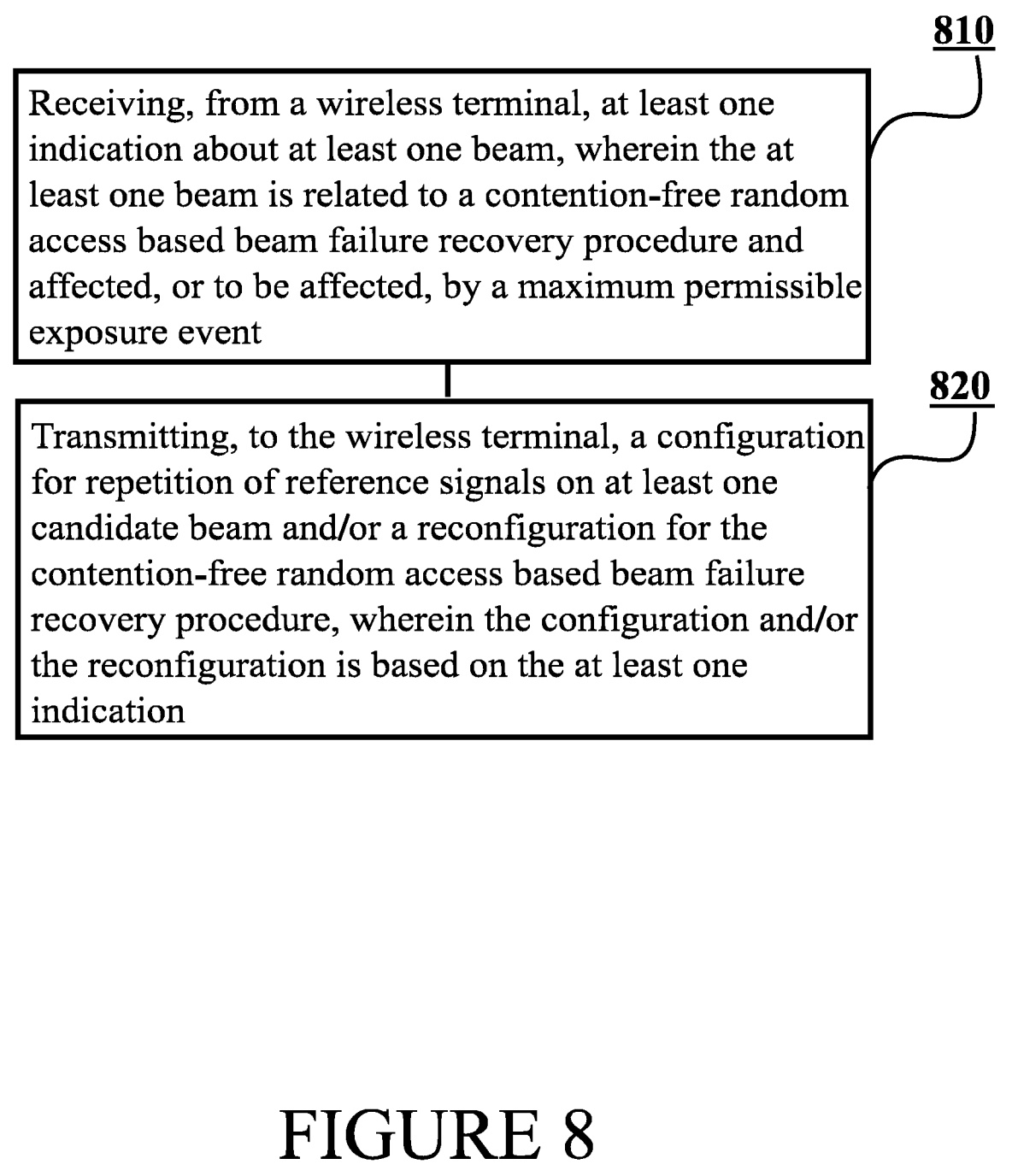

Receiving, from a wireless terminal, at least one indication about at least one beam, wherein the at least one beam is related to a contention-free random access based beam failure recovery procedure and affected, or to be affected, by a maximum permissible exposure event

820

Transmitting, to the wireless terminal, a configuration for repetition of reference signals on at least one candidate beam and/or a reconfiguration for the contention-free random access based beam failure recovery procedure, wherein the configuration and/or the reconfiguration is based on the at least one indication

FIGURE 8

BEAM FAILURE DETECTION AND RECOVERY IN WIRELESS COMMUNICATION NETWORKS

RELATED APPLICATION

This application claims priority to PCT Application No. PCT/EP2021/082111 filed Nov. 18, 2021, which claims priority benefit from FI application No. 20206204 filed Nov. 25, 2020, which is incorporated herein by reference in its entirety.

FIELD

Various example embodiments relate in general to wireless communication networks and more specifically, to beam failure detection and recovery in such networks.

BACKGROUND

Beam failure detection and recovery refer to a set of functionalities that can be used to ensure proper operation of beam-based wireless communication systems. First, beam failure detection may be used to detect if a serving beam is not suitable for communication anymore and after that, beam failure recovery may be used to determine another beam which is suitable for communication in the current situation.

Beam failure detection and recovery may be used for example in various cellular communication networks, such as, in cellular communication networks operating according to 5G radio access technology. 5G radio access technology may also be referred to as New Radio, NR, access technology. 3rd Generation Partnership Project, 3GPP, develops standards for 5G/NR and one of the topics in the 3GPP discussions is related to beam failure detection and recovery. According to the discussions there is a need to provide improved methods, apparatuses and computer programs related to beam failure detection and recovery in cellular communication networks. Beam failure detection and recovery may also be beneficial in other wireless communication networks as well.

SUMMARY

According to some aspects, there is provided the subject-matter of the independent claims. Some embodiments are defined in the dependent claims.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect of the present invention, there is provided an apparatus comprising at least one processing core, at least one memory including computer program code, the at least one memory and the computer program code being configured to, with the at least one processing core, cause the apparatus at least to detect a maximum permissible exposure event or that the maximum permissible exposure event is potential, determine at least one beam for a contention-free random access based beam failure recovery procedure, wherein the at least one beam is affected, or will be affected, by the maximum permissible exposure event and transmit to a wireless network node at least one indication about the at least one beam. The apparatus of the first aspect may be a wireless terminal or a control device configured to control the functioning thereof, possibly when installed therein.

Embodiments of the first aspect may comprise at least one feature from the following bulleted list or any combination of the following features:

- the at least one indication comprises an indication about at least one beam which has been detected, by the apparatus, as not usable for the beam failure recovery procedure due to the maximum permissible exposure event;
- the at least one beam which has been detected as not usable for the beam failure recovery procedure is in a set of beams configured for the contention-free random access based beam failure recovery procedure;
- the at least one indication comprises a single-bit indication indicating that none, or some, of the set of beams configured for the beam failure recovery procedure have been detected as usable;
- the at least one memory and the computer program code are further configured to, with the at least one processing core, cause the apparatus at least to determine, upon detecting the beam failure, that the set of beams does not comprise any beam which has been detected as usable due to the maximum permissible exposure event and perform a contention-based random access procedure on a beam which is not in the set of beams without performing the contention-free random access procedure before the contention-based random access procedure;
- the at least one memory and the computer program code are further configured to, with the at least one processing core, cause the apparatus at least to perform, upon detecting the beam failure, the beam failure recovery procedure on at least one candidate beam without taking into account the at least one beam which has been detected as not usable for the beam failure recovery procedure;
- the at least one indication comprises an indication about at least one candidate beam preferred by the apparatus;
- the at least one memory and the computer program code are further configured to, with the at least one processing core, cause the apparatus at least to receive from the wireless network node, responsive to transmitting the indication about the at least one preferred beam, a configuration for repetition of reference signals on the at least one candidate beam and train, using said repeated reference signals, a receiver of the apparatus to receive on the at least one candidate beam;
- the at least one indication about the at least one beam is transmitted to the wireless network node before detecting a beam failure.

According to a second aspect of the present invention, there is provided an apparatus comprising at least one processing core, at least one memory including computer program code, the at least one memory and the computer program code being configured to, with the at least one processing core, cause the apparatus at least to receive, from a wireless terminal, at least one indication about at least one beam, wherein the at least one beam is related to a contention-free random access based beam failure recovery procedure and affected, or to be affected, by a maximum permissible exposure event and transmit, to the wireless terminal, a configuration for repetition of reference signals on at least one candidate beam and/or a reconfiguration for the contention-free random access based beam failure recovery procedure, wherein the configuration and/or the reconfiguration is based on the at least one indication. The apparatus of the second aspect may be a wireless network node or a control device configured to control the functioning thereof, possibly when installed therein.

Embodiments of the second aspect may comprise at least one feature from the following bulleted list or any combination of the following features:

the at least one indication indicates that the at least one beam has been detected as not usable for the beam failure recovery procedure due to the maximum permissible exposure event and the reconfiguration does not comprise the at least one beam affected, or to be affected, by the maximum permissible exposure event;

the at least one indication comprises an indication about at least one candidate beam preferred by the wireless terminal and the configuration indicates repetition of reference signals on the at least one candidate beam preferred by the wireless terminal.

According to a third aspect of the present invention, there is provided an apparatus comprising means for detecting a maximum permissible exposure event or that the maximum permissible exposure event is potential, means for determining at least one beam for a contention-free random access based beam failure recovery procedure, wherein the at least one beam is affected, or will be affected, by the maximum permissible exposure event and means for transmitting to a wireless network node at least one indication about the at least one beam. The apparatus of the third aspect may be a wireless terminal or a control device configured to control the functioning thereof, possibly when installed therein.

According to a fourth aspect of the present invention, there is provided an apparatus comprising means for receiving, from a wireless terminal, at least one indication about at least one beam, wherein the at least one beam is related to a contention-free random access based beam failure recovery procedure and affected, or to be affected, by a maximum permissible exposure event and means for transmitting, to the wireless terminal, a configuration for repetition of reference signals on at least one candidate beam and/or a reconfiguration for the contention-free random access based beam failure recovery procedure, wherein the configuration and/or the reconfiguration is based on the at least one indication. The apparatus of the fourth aspect may be a wireless network node or a control device configured to control the functioning thereof, possibly when installed therein.

According to a fifth aspect, there is provided a first method comprising, detecting a maximum permissible exposure event or that the maximum permissible exposure event is potential, determining at least one beam for a contention-free random access based beam failure recovery procedure, wherein the at least one beam is affected, or will be affected, by the maximum permissible exposure event and transmitting to a wireless network node at least one indication about the at least one beam. The first method may be performed by a wireless terminal or a control device configured to control the functioning thereof, possibly when installed therein.

According to a sixth aspect, there is provided a second method comprising, receiving, from a wireless terminal, at least one indication about at least one beam, wherein the at least one beam is related to a contention-free random access based beam failure recovery procedure and affected, or to be affected, by a maximum permissible exposure event and transmitting, to the wireless terminal, a configuration for repetition of reference signals on at least one candidate beam and/or a reconfiguration for the contention-free random access based beam failure recovery procedure, wherein the configuration and/or the reconfiguration is based on the at least one indication. The second method may be performed by a wireless network node or a control device configured to control the functioning thereof, possibly when installed therein.

According to a seventh aspect of the present invention, there is provided non-transitory computer readable medium having stored thereon a set of computer readable instructions that, when executed by at least one processor, cause an apparatus to at least to perform the first method. According to an eighth aspect of the present invention, there is provided a non-transitory computer readable medium having stored thereon a set of computer readable instructions that, when executed by at least one processor, cause an apparatus to at least to perform the second method.

According to a ninth aspect of the present invention, there is provided a computer program comprising instructions which, when the program is executed by an apparatus, cause the apparatus to carry out the first method. According to a tenth aspect of the present invention, there is provided a computer program comprising instructions which, when the program is executed by an apparatus, cause the apparatus to carry out the second method.

BRIEF DESCRIPTION OF THE DRAWINGS

FIG. 7 illustrates a flow graph of a first method in accordance with at least some embodiments;

FIG. 8 illustrates a flow graph of a second method in accordance with at least some embodiments.

EMBODIMENTS

Beam failure detection and recovery may be improved by the procedures described herein. More specifically, beam failure detection and recovery may be improved by making it possible for a wireless terminal to transmit to a wireless network node at least one indication about at least one beam, such as an indication about at least one Contention-Free Random Access, CFRA, resource associated with the at least one beam. The at least one beam may be affected, or will be affected, by a Maximum Permissible Exposure, MPE, event and the at least one indication may be transmitted, preferably before a beam failure is detected, thereby ensuring that beams which may be affected by the MPE will not be considered for Beam Failure Recovery, BFR. The wireless terminal may for example indicate that the at least one CFRA resource associated with the at least one beam has been detected, by the wireless terminal, as not usable for BFR due to the MPE, i.e., BFR using the at least one beam will fail for sure or will likely fail, or may be suboptimal for communication. Alternatively, or in addition, the wireless terminal may indicate a preferred beam.

Figure 1:
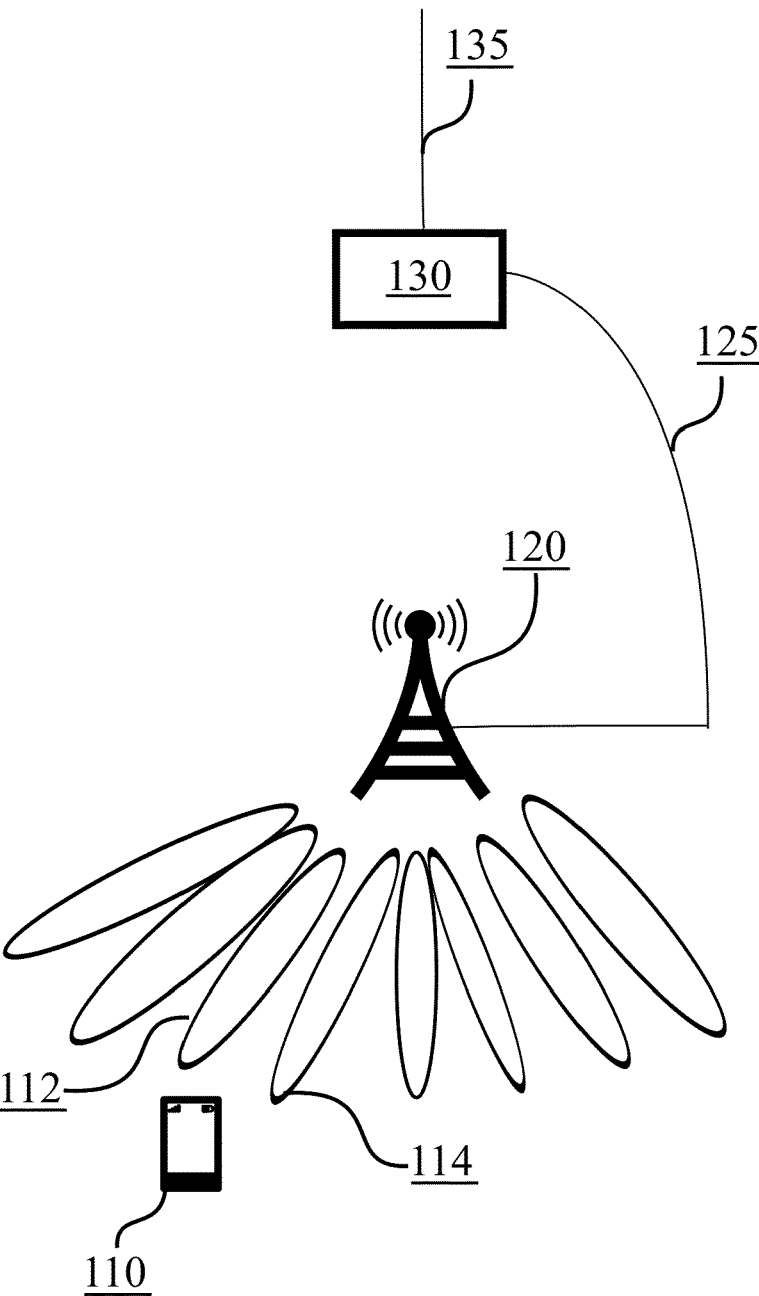
FIG. 1 illustrates an example of a network scenario in accordance with at least some embodiments.

FIG. 1 illustrates an example of a network scenario in accordance with at least some embodiments. According to the example scenario of FIG. 1, there may be a beam-based wireless communication system, which comprises wireless terminal 110, wireless network node 120 and core network element 130. Wireless terminal 110 may be connected to wireless network node 120 via air interface using beams 112 and 114, either simultaneously or one at a time. Wireless network node 120 may be a network entity that configures some or all control information of wireless terminal 110 and allocates resources for wireless terminal 110.

Wireless terminal 110 may comprise, for example, a User Equipment, UE, a smartphone, a cellular phone, a Machine-to-Machine, M2M, node, Machine-Type Communications, MTC, node, an Internet of Things, IoT, node, a car telemetry unit, a laptop computer, a tablet computer or, indeed, any kind of suitable wireless terminal. In the example system of FIG. 1, wireless terminal 110 may communicate wirelessly with wireless network node 120 via beam 112 and/or beam 114. Wireless network node 120 may be considered as a serving node for wireless terminal 110 and one cell of wireless network node 120 may be a serving cell for wireless terminal 110.

Air interface between wireless terminal 110 and wireless network node 120 may be configured in accordance with a Radio Access Technology, RAT, which both wireless terminal 110 and wireless network node 120 are configured to support. Examples of cellular RATs include Long Term Evolution, LTE, New Radio, NR, which may also be known as fifth generation, 5G, radio access technology and Multe-Fire. On the other hand, examples of non-cellular RATs include Wireless Local Area Network, WLAN, and World-wide Interoperability for Microwave Access, WiMAX.

For example, in the context of LTE, wireless network node 120 may be referred to as eNB while wireless network node 120 may be referred to as gNB in the context of NR. In some embodiments, wireless network node 120 may be referred to as a Transmission and Reception Point, TRP, or control multiple TRPs that may be co-located or non-co-located. Wireless terminal 110 may be similarly referred to as a UE, e.g., in the context of LTE and NR. Also, for example in the context of WLAN, wireless network node 120 may be referred to as an access point while wireless terminal 110 may be referred to as a mobile station. In any case, embodiments of the present invention are not restricted to any particular wireless technology. Instead, embodiments may be exploited in any beam-based wireless communication system.

Wireless network node 120 may be connected, directly or via at least one intermediate node, with core network 130 via interface 125. Core network 130 may be, in turn, coupled via interface 135 with another network (not shown in FIG. 1), via which connectivity to further networks may be obtained, for example via a worldwide interconnection network. Wireless network node 120 may be connected, directly or via at least one intermediate node, with core network 130 or with another core network.

In some example embodiments of the present invention, the exemplary network scenario may comprise a relay instead of, or in addition to, wireless terminal 110 and/or wireless network node 120. Relaying may be used for example when operating on millimeter-wave frequencies. One example of the relay may be an Integrated Access and Backhaul, IAB, node. The IAB node may be referred to as a self-backhauling relay as well. Another example of a relay may be an out-band relay. In general, the relay node may comprise two parts:

1) Distributed Unit, DU, part which may facilitate functionalities of wireless network node 120, such as a gNB. Thus, in some embodiments, the DU part of a relay may be referred to as wireless network node 120.

2) Mobile Termination, MT, part which may facilitate functionalities of wireless terminal 110, i.e., a backhaul link which may be the communication link between a parent node (DU), such as a DU part of wireless network node 120, and the relay, such as an IAB node. In some embodiments, the MT part may be referred to as wireless terminal 110.

In beam-based wireless communication systems beam failure detection and recovery may be used to ensure that wireless terminal 110 may continue communicating with wireless network node 120 even if a beam failure happens on a serving beam. BFR procedure may be used, e.g., to indicate to wireless network node 120 of a new beam, or a Synchronization Signal Block, SSB, or Channel State Information-Reference Signal, CSI-RS associated with the new beam, when a beam failure is detected on the serving beam.

Governmental MPE guidelines may be in place to prevent health issues due to thermal effect. The MPE may be for example a regulation on a power density related to a signal transmitted by an antenna. For instance, in the millimetre-wave regime a threshold for the MPE set by the Federal Communications Commission, FCC, may be 10 W/m$^2$ (1 mW/cm$^2$). Also, for a certain distance separating a tissue of a human from the antenna, a power back-off may be required, for example for FCC compliance with the MPE. The required power back-off may be rather large though, e.g., up to 30 dB for wireless devices transmitting at a maximum effective isotropic radiated power limit, such as 43 dBm for PC3 UEs. Thus, the required back-off will likely cause radio link failures, since a large back-off would degrade an uplink such that a maximum number of radio link control retransmissions would be reached. Moreover, the power back-off may only apply to the uplink and thus result in severe link imbalance between uplink and downlink budgets.

It should be noted that during MPE events, a body of a user of wireless terminal 110 may severely block a propagation path between wireless terminal 110 and wireless network node 120 as well. As such, path losses in both, uplink and downlink, may be affected (almost) equally by the blockage caused by an MPE event, but uplink transmit power would be further reduced due to transmission power restriction caused by the MPE. Even though degradation of the uplink may affect signal-to-noise ratio in uplink only, but not in downlink, a blockage caused by the user of wireless terminal 110 may lead to a beam failure and/or radio link failure.

If the blockage caused by the user of wireless terminal 110 on the propagation path between wireless terminal 110 and wireless network node 120 causes a beam failure at wireless terminal 110, wireless terminal 110 may attempt BFR on at least one candidate beam configured for BFR by wireless network node 120. More specifically, wireless terminal 110 may attempt BFR on at least one physical resource associated with the at least one candidate beam configured for BFR. Thus, success of BFR depends on which beams/resources are selected and configured for BFR.

The at least one candidate beam, and the at least one physical resource associated with the at least one candidate beam, may be configured for BFR for example by using a list, like candidateBeamRSList which may be transmitted within an information element, like BeamFailureRecovery-Config IE. The at least one physical resource associated with the at least one candidate beam may be for example a periodic CSI-RS and/or SSB resource. The at least one physical resource associated with the at least one candidate beam may be indicated to wireless terminal 110 using an index and configured using a Radio Resource Control, RRC, list, such as a failureDetectionResources, see for example 3GPP standard specification TS 38.213, section 6. Failure-DetectionResources may be a list of RSs, pointed by their indices and used for radio link monitoring. SSB-based Beam Failure Detection, BFD, may be based on a SSB transmitted on an initial downlink bandwidth part and SSB-based BFD may only be configured for the initial downlink bandwidth part. For other downlink bandwidth parts, BFD may only be performed based on CSI-RS.

Upon detecting a beam failure, wireless terminal 110 may perform BFR via a random access procedure on the at least one candidate beam configured by wireless network node 120 for BFR. Wireless terminal 110 may for example perform the random access procedure on resources dedicated and configured by wireless network node 120 for CFRA.

It should be noted that the at least one candidate beam may be configured by wireless network node 120 for BFR before the MPE event, i.e., before wireless terminal 110 detects the MPE event. If the CFRA-based BFR procedure on the at least one candidate beam fails, wireless terminal 110 may need to attempt Contention-Based Random Access, CBRA, on another resource, such as another SSB resource, or another beam which are not configured with CFRA resources for BFR. The CBRA-based BFR may be performed on a Physical Random Access Channel, PRACH, for example. However, use of CBRA is not usually preferred because failures are possible due to the contention, which further induces delays for BFR. CFRA-based BFR is therefore preferred to enable faster recovery.

Figure 2A:
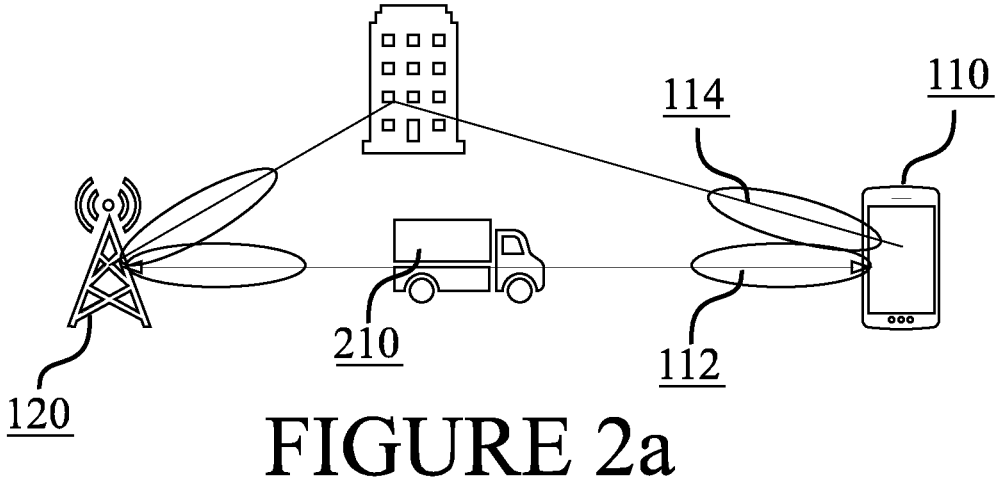
FIG. 2a illustrates a beam failure scenario due to a classical blockage in accordance with at least some embodiments.
Figure 2B:
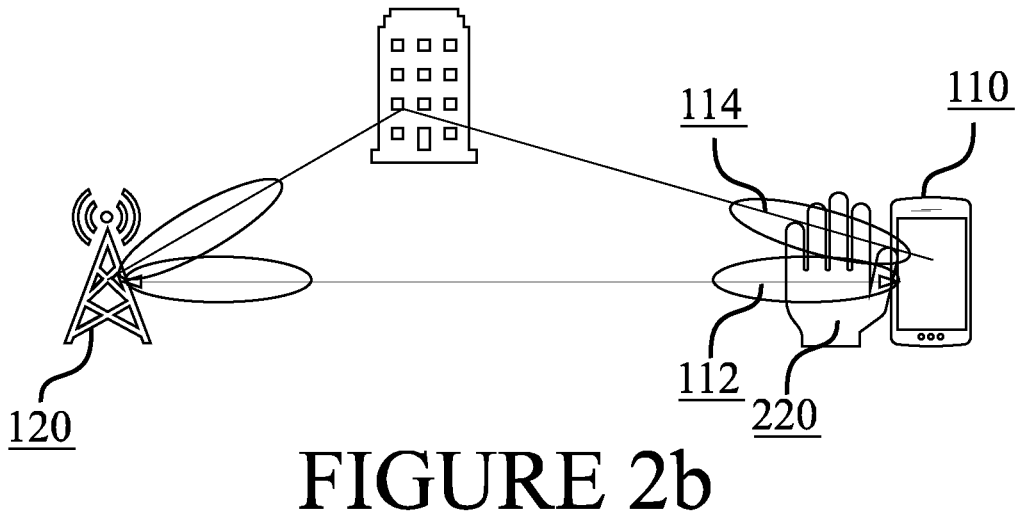
FIG. 2b illustrates a beam failure scenario due to a user blockage causing MPE in accordance with at least some embodiments.

FIG. 2a illustrates a beam failure scenario due to a classical blockage in accordance with at least some embodiments while FIG. 2b illustrates a beam failure scenario due to a user blockage causing MPE in accordance with at least some embodiments. In FIGS. 2a and 2b, wireless terminal 110 and wireless network node 120 of FIG. 1 are shown along with beams 112 and 114. Beams 112 and 114 may be referred to as a first beam and a second beam, respectively.

As illustrated in FIG. 2a, in case of the classical blockage wireless terminal 110 may experience a beam failure due to an obstacle, such as vehicle 210, further away from wireless terminal 110. For instance, wireless terminal 110 may experience a beam failure on at least one physical resource associated with first beam 112, such as a SSB1 or CSI-RS signals that have the SSB1 as Quasi-Co Location, QCL, source. Thus, wireless terminal 110 may attempt CFRA-based BFR on at least one physical resource associated with second beam 114, such as a SSB2 or CSI-RS signals that have the SSB2 as a QCL source. In case of the classical blockage, the BFR may be successful.

However, in case of the user blockage causing MPE as illustrated in FIG. 2b, part 220 of a body of a user of wireless terminal 110 may cover an entire antenna panel of wireless terminal 110, i.e., both beams 112 and 114. Thus, CFRA-based BFR on the at least one physical resource associated with second beam 114 would fail, at least from an uplink perspective, if wireless network node 120 assumes an uplink spatial relation based on an indicated downlink RS. CFRA-based BFR on the at least one physical resource associated with second beam 114 may also fail in case of downlink as well. As the at least one physical resource associated with second beam 114 was configured before the MPE event, the resources for CFRA-based BFR may likely be on the same (and/or neighboring) beams/resources, such as SSB, and/or even on the same panel of wireless terminal 110.

So in case of BFR, caused for example due to MPE or downlink beam failure, one challenge is that CFRA-based BFR with CFRA resources indicating second beam 114 (SSB2 and any SSB seen from the antenna panel of wireless terminal 110 affected by the MPE event) may fail because downlink may be obstructed and RSs cannot be thus received by wireless terminal 110. In other words, downlink may become obstructed/unusable since the SSB that can be used to indicate using corresponding CFRA resources may be received on the antenna panel of wireless terminal 110 affected by the MPE. In this case wireless terminal 110 may not select/consider such SSB/CSI-RS (or DL RS) as BFR candidate and thus the corresponding/associated CFRA (or CBRA) resource is considered unusable.

Uplink may be even more degraded due to MPE Power management-Maximum Power Reduction, P-MPR, and a transmission on a random access channel cannot be received by wireless network node 120. Even if wireless network node 120 could receive the transmission on the random access channel, a corresponding uplink beam, which may be configured based on an indicated downlink RS, would not be optimal for communication due to the MPE event. Furthermore, MPE P-MPR is an uplink power restriction and is not necessarily seen in downlink measurements. Hence, CFRA-based BFR may fail, e.g., if transmission power of wireless terminal 110 is too low in the random access channel, or the uplink may be non-optimal upon successful BFR (e.g., the uplink quality would be sub-par/not optimal/not good enough for data and control transmission although the BFR procedure was successfully carried out and new link was established).

If wireless terminal 110 detects that the candidate beams (e.g. the beams that can be indicated using CFRA) for BFR due to MPE has been detected as not usable, wireless terminal 110 may fall back and use CBRA resources for BFR. Wireless terminal 110 may also need to attempt BFR with antenna panels not covered by part 220 of the user, and such antenna panels may not detect the same beams transmitted by wireless network node 120 that were configured for the CFRA-based BFR. As a result, CFRA configuration may have been a waste of resources and time would be wasted if wireless terminal 110 tries to perform CFRA for nothing. On the other hand, CBRA BFR mechanism is not as robust as CFRA and may fail, e.g., due to latency and contention risk. CFRA would be thus preferred, but without wasting resources and time.

Embodiments of the present invention therefore enable configuring candidate beam(s) and resources for BFR before BFD, to enable faster recovery, preferably using CFRA. Embodiments of the present invention make it possible for wireless terminal 110 to provide at least one indication about at least one candidate beam (i.e. RSs) which is affected, or will be affected, by the MPE event. The at least one indication about the at least one candidate beam may be an indication about a CFRA resource associated with the at least one candidate beam. In other words, a candidate beam or a beam may be identified by a downlink RS (SSB and/or CSI-RS) and specific uplink resource (e.g. PRACH preamble) may be associated with the corresponding downlink RS. In addition, or alternatively, the at least one indication about the at least one candidate beam may comprise an indication about at least one candidate beam preferred by wireless terminal 110.

Thus, wireless terminal 110 may down-select the candidate beams configured by wireless network node 120. That is to say, if wireless network node 120 provides a set of candidate beams and RSs for CFRA-based BFR to wireless terminal 110, wireless terminal 110 may detect that at least one of the configured beams of the set is not usable due to the MPE. That is to say, wireless terminal 110 may detect that the at least one beam is not usable at the moment (in case of an MPE event) or will not be usable at some point in the future with some likelihood (in case of an MPE warning). Thus, wireless terminal 110 may detect that the at least one beam is not usable for BFR due to the MPE because BFR using the at least one beam will fail for sure due to the MPE, or in some other cases detect that the at least one beam is not usable for BFR due to the MPE because BFR using the at least one beam will likely fail due to the MPE. Thus, wireless terminal 110 may determine that at least one CFRA resource associated with a specific downlink RS, i.e., a candidate beam, is not usable or not preferred due to the MPE.

Wireless terminal 110 may then transmit to wireless network node 120 the at least one indication about the at least one beam, i.e., the CFRA resource, preferably before BFD and/or before BFR, and possibly pro-actively along with an MPE warning or re-actively along with an MPE event indication. Wireless network node 120 may then reconfigure the candidate beams and CFRA resources accordingly. When wireless terminal 110 has provided the at least one indication about the at least one beam, wireless terminal 110 is not required anymore to evaluate the at least one beam when considering candidate beams for BFR. Thus, the BFR is faster because wireless terminal 110 does not need to consider the at least one beam or the indicated the at least one CFRA resource, and wireless terminal 110 may, upon BFD perform BFR on at least one candidate beam without taking into account the at least one beam which has been detected as not usable due to the MPE.

Moreover, in some embodiments, the at least one indication about the at least one beam may be an indication (e.g. comprising of one or more bits or a message, e.g. MAC CE/RRC) indicating that none, or some but not all, of the set of beams, i.e., CFRA resources, can be used due to the MPE. In such a case, wireless terminal 110 is not required to evaluate any of the candidate beams, or CFRA resources, in the set after transmitting the indication. Thus, the BFR is even faster because wireless terminal 110 does not need to consider the indicated beam(s) and CFRA resources at all and wireless terminal 110 may, upon BFD, perform CBRA directly without performing CFRA first regardless of the configuration. That is to say, wireless terminal 110 may perform CBRA without performing CFRA before CBRA even if wireless terminal 110 would be configured with some candidate beams.

In some embodiments, wireless terminal 110 may transmit the at least one indication about the at least one beam which is affected, or will be affected, by the MPE and select at least one preferred candidate beam, i.e., CFRA/CBRA resource, as a BFR candidate (a candidate beam). The at least one candidate beam preferred by wireless terminal 110 may be indicated to wireless network node 120 as well. In such a case, wireless terminal 110 may expect not to be configured with an uplink beam which has a spatial relation with the indicated at least one beam. As an example, wireless terminal 110 may still indicate/select a downlink resource to be BFR candidate (although the uplink would be affected by MPE) since it has indicated network that it is affected by MPE, i.e., wireless terminal 110 may expect NW to configure another beam and/or re-train the uplink beam of wireless terminal 110. Alternatively, or in addition, Wireless network node 120 may trigger repetition of RSs (CSI-RS with 'Repetition ON', e.g., for the indicated preferred beam or for the indicated CSI-RS, or for a CSI-RS that is QCL'd with the downlink RS indicated by the random access preamble, e.g., CFRA). As a further example, when wireless terminal 110 selects for BFR a candidate beam that it has indicated to be affected by MPE, wireless terminal 110 may assume/expect/receive (a triggering of) or request network to trigger repetition transmission for the indicated CSI-RS (or for CSI-RS that has the indicated DL RS as a QCL source).

In some embodiments, wireless network node 120 may trigger aperiodic CSI-RS transmission for which wireless terminal 110 may report the measurements, such as RSRP measurements, with respect to an assumed uplink RSRP. As an example the measurements of downlink RSs (RSRP) may be reported so that uplink transmission power reduction is taken into account, for example downlink RSRP value may be reduced by the amount of applied uplink transmission power backoff. The reported downlink RSRP value may thus be used to indicate to wireless network node 120 (implicitly) that a specific beam may not be suitable for both uplink and downlink. In some embodiments, wireless network node 120 may select one or more resources/beams that were not indicated by wireless terminal 110 as affected by the MPE and configure wireless terminal 110 with the selected resources/beams as CFRA candidates.

Alternatively, or in addition, the at least one indication about the at least one beam may explicitly indicate potential recovery candidate beams, i.e., candidate beams preferred by wireless terminal 110. Wireless terminal 110 may thus provide to wireless network node 120 information for reconfiguring the CFRA resources/beams to include the beams preferred by wireless terminal 110 and wireless network node 120 may exploit the information about the preferred beams for configuring wireless terminal 110, instead of reselecting a pool of beams without assistance of wireless terminal 110. In some embodiments, the at least one indication about the at least one beam transmitted by wireless terminal 110 may indicate a preferred SSB and/or CSI of the preferred beam(s) to add to CFRA beam candidate list for BFR.

Alternatively, or in addition, wireless terminal 110 may detect an MPE event or that the MPE event is potential. Wireless terminal 110 may determine at least one beam for a random access (either contention based or contention free, or both) based beam failure recovery procedure, wherein the at least one beam is affected, or will be affected, by the MPE event. Wireless terminal 110 may transmit to wireless network node 120 at least one indication about the at least one beam, e.g., before detecting a beam failure. Alternatively, or additionally, after transmission the indication, wireless terminal 110 is not required to evaluate the candidates affected by MPE for beam failure recovery. In yet one alternative, wireless terminal 110 may upon detecting MPE event for one or more beams (or at least one), determine that it is not required to evaluate (or select or consider) the candidate beam for BFR. In other words, wireless terminal 110 is not required to select random access preambles associated with beams that are considered to be affected by MPE.

In some embodiments, wireless network node 120 may choose, after receiving the indication about the at least one beam, such as SSB and/or CSI indication, preferred by wireless terminal 110, to schedule repetition of CSI on the at least one beam preferred by wireless terminal 110, to speed up beam recovery and configure CFRA as a fall-back as well. Wireless terminal 110 may then prioritize CFRA configuration on the beam trained using CSI repetition, in uplink and/or downlink for faster beam recovery. As an example, if more than one candidate beam for CFRA is above a RSRP threshold of a candidate beam, wireless terminal 110 may select at least one of the candidates that wireless network node 120 triggered, and trained with, the CSI-RS repetition 'on'. Training may refer for example to optimizing operation of a receiver of wireless terminal 110 by using multiple CSI-RSs received while repetition is 'on'. Additionally, in some embodiments, wireless terminal 110 may prioritize the CFRA candidate resource/beams if wireless network node 120 has triggered the repetition of CSI-RS within a time period of N milliseconds.

Figure 3:
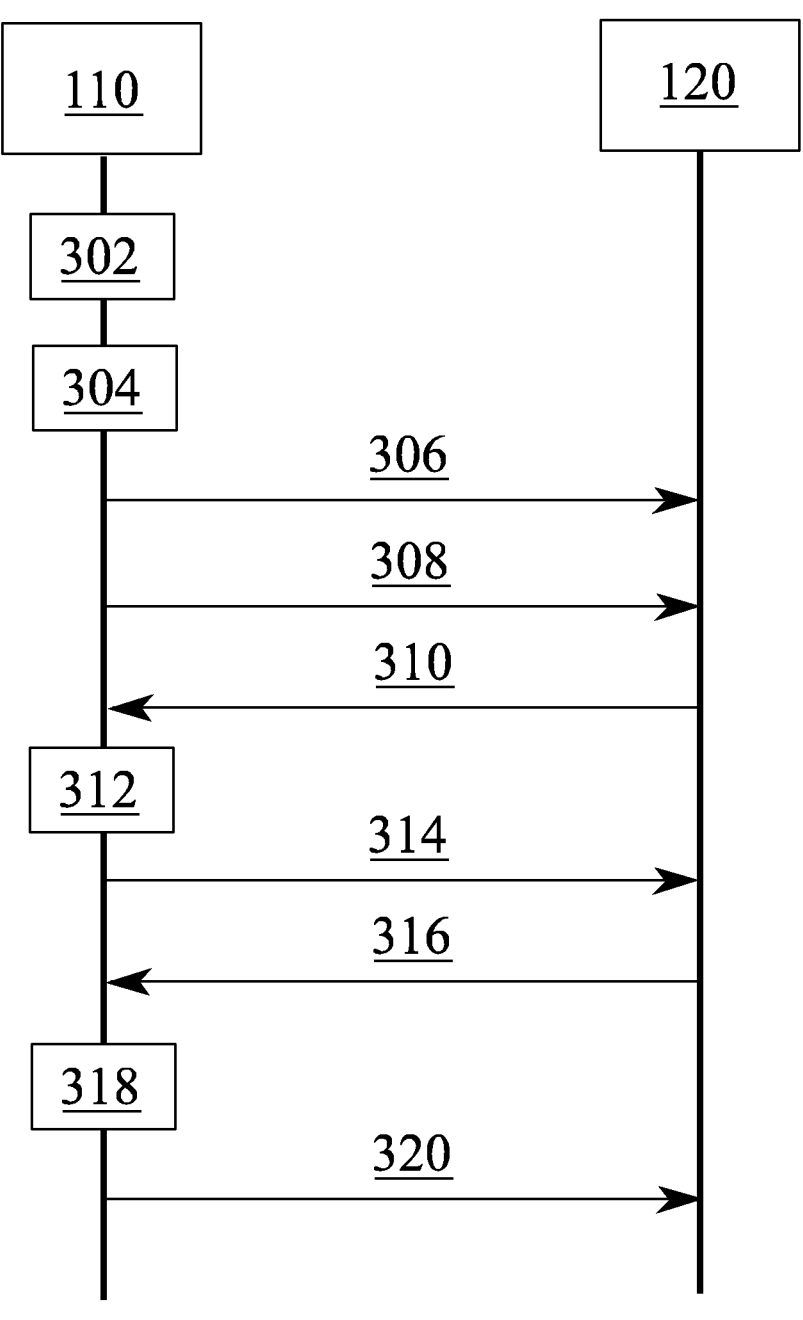
FIG. 3 illustrates a first signaling graph in accordance with at least some embodiments.

FIG. 3 illustrates a first signaling graph in accordance with at least some embodiments. On the vertical axes are disposed, from the left to the right, wireless terminal 110 and wireless network node 120. Time advances from the top towards the bottom.

At step 302, wireless terminal 110 may detect a potential MPE event. That is to say, wireless terminal 110 may determine that there is a need to provide information related to the potential MPE event to wireless network node 120 when the potential MPE event is detected. Potential MPE event may be detected, e.g., using proximity sensors of wireless terminal 110, such as infrared sensors, capacitive sensors, radar, radar embedded in an antenna array of wireless terminal 110, etc. Proximity sensors on wireless terminal 110 may be calibrated to trigger at different distances. One distance may be related to the MPE event (e.g., 14 cm) while another distance may be related to the MPE warning (e.g. 16 cm). The MPE warning region may be configured by wireless network node 120.

At step 304, wireless terminal 110 may determine at least one beam which will be affected by the detected potential MPE event. The at least one beam may be related to a CFRA-based BFR procedure, i.e., be a candidate beam.

At step 306, wireless terminal 110 may transmit a warning about the potential MPE event to wireless network node 120. At step 308, wireless terminal 110 may transmit the at least one indication about the at least one beam to wireless network node 120. The at least one indication may comprise for example an indication about at least one beam which has been detected as not usable for BFR due to the MPE event and/or an indication about at least one beam preferred by wireless terminal 110, such as an indication about a preferred SSBRI/CRI.

Upon receiving the indication, wireless network node 120 may, at step 310, transmit a reconfiguration for BFR, such as a RRC reconfiguration, to wireless terminal 110. The reconfiguration may be based on the at least one indication received from wireless terminal 110. For instance, if the at least one indication indicates that the at least one beam has been detected as not usable for BFR due to the MPE event, the reconfiguration may not comprise the at least one beam affected, or to be affected, by the MPE event. However, if the at least one indication comprises an indication about at least one beam preferred by wireless terminal 110, the reconfiguration may comprise the at least one preferred beam as a candidate beam.

At step 312, wireless terminal 110 may detect the MPE event. Upon detecting the MPE event, wireless terminal 110 may, at step 314, transmit an indication about the detected MPE event, possibly including P-MPR, to wireless network node 120. At step 316, wireless network node 120 may respond by transmitting another reconfiguration, such as a configuration for repetition of CSI-RSs on the at least one candidate beam. Said another reconfiguration may be for example P3 with CSI-RS repetition 'on'. Wireless terminal 110 may thus train its receiver to receive on the at least one candidate beam using said repeated CSI-RSs.

At step 318, wireless terminal 110 may detect a beam failure and perform BFR by selecting a suitable candidate beam. Wireless terminal 110 may prioritize the at least one trained candidate beam for example. Finally, at step 320, wireless terminal 110 may transmit a random access message on the selected beam, e.g., on a PRACH with CFRA on the preferred SSBRI/CRI.

Figure 4:
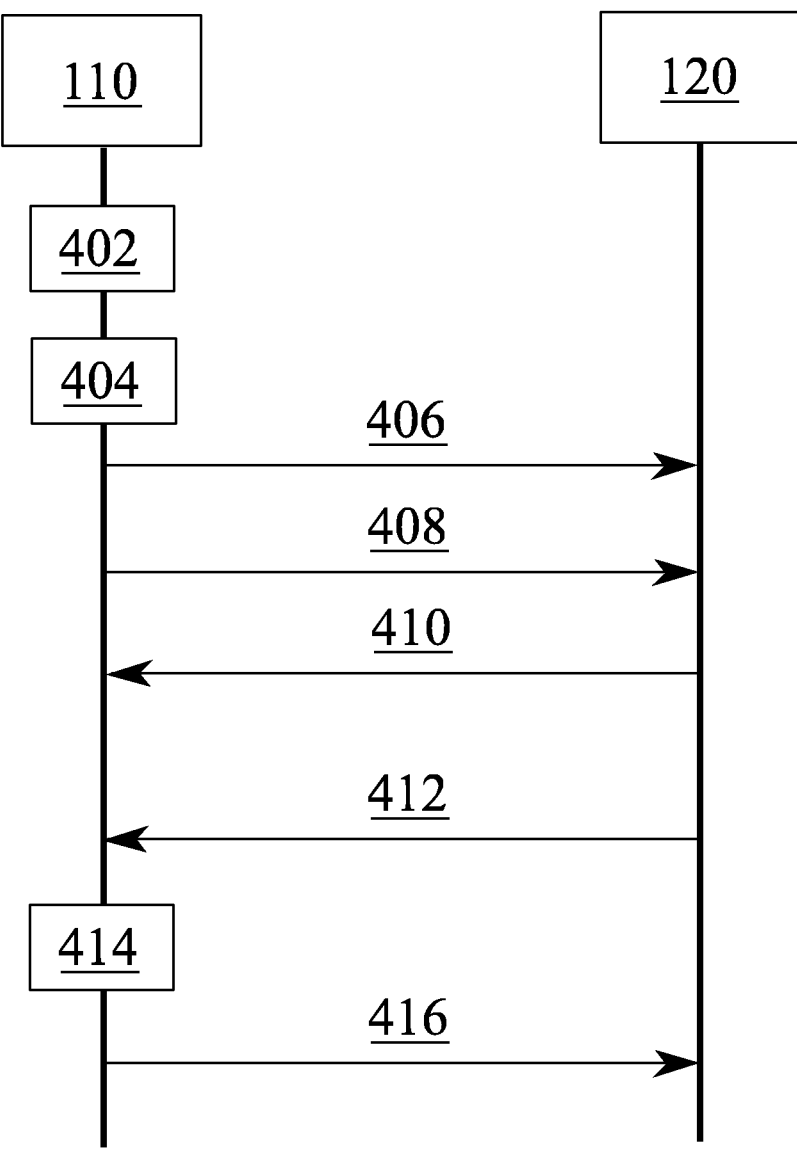
FIG. 4 illustrates a second signaling graph in accordance with at least some embodiments.

FIG. 4 illustrates a second signaling graph in accordance with at least some embodiments. On the vertical axes are disposed, from the left to the right, wireless terminal 110 and wireless network node 120. Time advances from the top towards the bottom.

At step 402, wireless terminal 110 may detect an MPE event. The MPE event may be detected using said proximity sensors of wireless terminal 110 as well. That is to say, wireless terminal 110 may determine that there is a need to provide information related to the MPE event to wireless network node 120 when the MPE event is detected. At step 404, wireless terminal 110 may determine at least one beam related to a CFRA-based BFR procedure, wherein the at least one beam is affected by the detected MPE event.

At step 406, wireless terminal 110 may transmit the indication about the detected MPE event similarly as at step 314 of FIG. 3. At step 408, wireless terminal 110 may transmit the at least one indication about the at least one beam to wireless network node 120 similarly as at step 308 of FIG. 3. Then, step 410 corresponds to step 310 in FIG. 3 and steps 412, 414 and 416 correspond to steps 316, 318 and 320 of FIG. 3, respectively.

Moreover, in some embodiments, the at least one indication may comprise an indication about whether wireless terminal 110 prefers BFR on a same SSB/CSI than a serving beam but with a different panel or one beam from a set of beam candidates configured by wireless network node 120. Alternatively, the at least one indication may comprise an indication about whether wireless terminal 110 prefers BFR on a different SSB/CSI than a serving beam but with a different panel or one beam which is not included in the set of beam candidates configured by wireless network node 120.

In some embodiments, a bitmap may be used by wireless terminal 110 to transmit the at least one indication about the at least one beam affected, or to be affected, by the MPE event. The bitmap may be used for example to indicate that the at least one beam has been detected as not usable for BFR due to the MPE event. So for example, a set of candidate beams may be provided to wireless terminal 110 for BFR by wireless network node 120 and after that, wireless terminal 110 may detect a potential MPE event and transmit an MPE warning, or detect an MPE event and transmit the MPE event indication to wireless network node 120. Based on the detected potential MPE or the event, wireless terminal may also transmit the at least one indication about the at least one beam affected, or to be affected, by the MPE event using the bitmap, thereby achieving more efficient signalling (small signalling overhead). In response to received indication, wireless network node 120 may reconfigure wireless terminal 110 with a new set of candidate beams for BFR. After reconfiguration, wireless terminal 110 may perform CFRA on a random access channel according to reconfiguration when a beam failure is detected.

However, if wireless network node 120 does not reconfigure wireless terminal 110 with the new set of candidate beams for BFR, and even if wireless network node 120 would configure wireless terminal 110 with the new set of candidate beams but there are no beams that would not trigger the MPE event, wireless terminal 110 may fall back to CBRA on a different beam. That is to say, wireless terminal 110 may determine, upon detecting the beam failure, that the set of configured beams does not comprise any beam which would not be affected by the MPE event and perform CBRA on a beam which is not in the set of configured beams without performing CFRA. Hence minimal signaling overhead is induced and the solution is applicable for example to a single TRP and BFD per TRP in multi-TRP In some embodiments, the at least one beam affected, or to be affected, by the MPE may be indicated by wireless terminal 110 in a MAC-CE. Wireless terminal 110 may then perform BFR using CFRA or MAC-CE. Use of the MAC-CE enables efficient combination of said indicating with MPE reporting.

In some embodiments, wireless terminal 110 may determine at least one preferred beam for BFR and transmit the at least one indication about the at least one candidate beam to wireless network node 120, wherein the at least one indication about the at least one candidate beam indicates the at least one preferred beam. For instance, the at least one indication may comprise an indication about a preferred list of beams for BFR with good uplink conditions. In addition, wireless terminal 110 may report downlink measurements, such as Reference Signal Receive Power, RSRP, of the preferred at least one beam. In such a case, beams which are determined as not affected, or not to be affected, by the MPE may be beams above a pre-defined threshold, wherein the pre-defined threshold may be configured by wireless network node 120. The indication about the at least one candidate beam preferred by wireless terminal 110 may indicate best SSB/CSI-RS candidate(s) for BFR. Wireless network node 120 may then reconfigure CFRA for BFR for the at least one preferred spatial reference signal, such as SSB/CSI-RS. Thus, most accurate reconfiguration for BFR is enabled, if wireless terminal 110 indicates best SSB/CSI candidate(s) for BFR and wireless network node 120 reconfigures the set of beams for BFR accordingly.

In some embodiments, repetition of CSI may be prioritized, for example for a preferred beam, such as a preferred SSBRI/CRI, before reconfiguration of BFR. Thus, there may be no need for random access, on PRACH for example, if repetition of CSI is 'on' and wireless terminal 110 may train its receiver to receive a candidate beam from a different antenna panel, i.e., not the antenna panel affected, or to be affected, by the MPE, to a serving CSI-RS (or a different one indicated by wireless terminal 110). The same CSI-RS may be seen from both antenna panels of wireless terminal 110 as there may be some angle-of-arrival across both antenna panels.

Wireless network node 120 may schedule CSI-RS for repetition instead of reconfiguring candidate beams and CFRA resource(s). In such a case, wireless terminal 110 may transmit an indication about the at least one candidate beam, or CSI-RS of the at least one candidate beam, to wireless network node 120 and receive a configuration for repetition of CSI-RS in response. Wireless terminal 110 may then train its receiver to receive the candidate beam for which the repetition is 'on' to avoid the MPE event. Alternatively, or in addition, wireless terminal 110 may indicate CRI for repetition of CSI, as seen from another panel of wireless terminal 110 which is not affected, or to be affected, by the MPE event. Faster repetition can be therefore achieved with less CFRA resource overhead.

Figure 5:
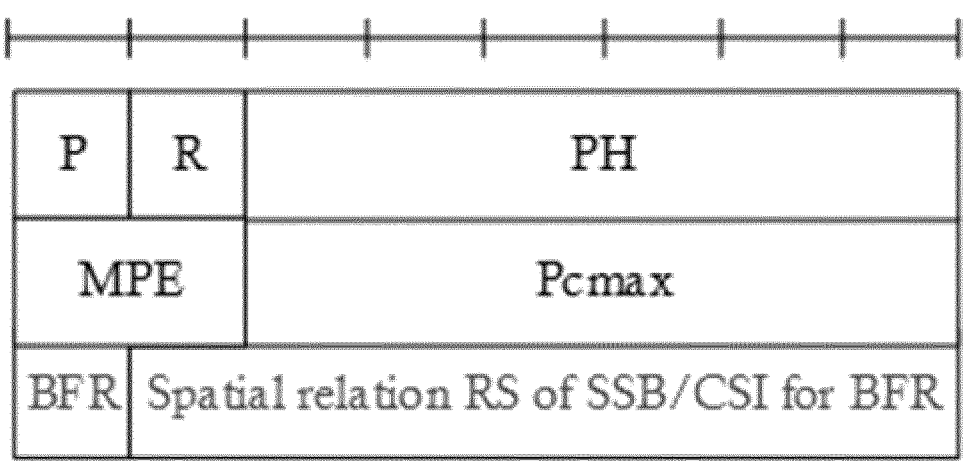
FIG. 5 illustrates a message format in accordance with at least some embodiments.

FIG. 5 illustrates a message format in accordance with at least some embodiments. The message format of FIG. 5 may be used by wireless terminal 110 to transmit the at least one indication about the at least one beam to wireless network node 120. The message format may be used for example in a power headroom report with an MPE event indication. If a P bit is set as 0, the MPE bits may be R bits. Hence, in some embodiments, said R bits may be reused to indicate a spatial reference signal, such as SSB and/or CSI-RS, which would be affected by MPE events and cannot be used for BFR if the spatial reference signal is received by a covered panel of wireless terminal 110 for example.

In some embodiments, one of the combinations of two R bits may be used to indicate how many of the configured spatial resources, i.e., candidate beams, would lead to an MPE event if used for BFR. Alternatively, one of said R bits may be used to indicate that none of the configured CFRA resources can be used without triggering an MPE event. Moreover, in some embodiments, one of said R bits may be used to indicate the preferred beam SSB/CSI-RS by wireless terminal 110 for BFR. However, it should be noted that other message container options are not precluded, e.g. new MAC-CE, L1-RSRP to indicate preferred beam for CFRA or L3 messages. It should also be noted that the preferred SSBRI/CRI indication may be part of an MPE warning (instead of an MPE event).

Embodiments of the present invention also provide a possibility for wireless network node 120 to reconfigure a beam failure instance, by reconfiguring for example BeamFailureInstanceMaxCount (BFI MAX COUNT) in BFD process and/or BeamFailureDetectionTIMER to smaller values depending on severity of the MPE event, which may be determined by wireless network node 120 from the reported P-MPR level, and RSRP levels.

Moreover, the at least one indication of wireless terminal 110 may be used to enhance BFR and associate different SSB/CSI-RS to take uplink conditions into account. Upon MPE event/warning, wireless network node 120 may schedule repetition of RS, such as CSI-RS repetition, on serving beam, which will give a chance to wireless terminal 110 to try out other beams that are not under MPE. Therefore, BFR may be avoided completely. Alternatively, if wireless terminal 110 reports at least one preferred candidate beam for BFR, wireless network node 120 may schedule repetition of RSs for the at least one preferred candidate beam and give a chance to wireless terminal 110 to align to the at least one preferred candidate beam using a panel not under MPE and still avoid BFR. At the same time, wireless network node 120 may also reconfigure BFR including the at least one preferred candidate beam, such that if repetition of RSs does not help and wireless terminal 110 still detected a beam failure, wireless terminal 110 may do BFR on the at least one preferred candidate beam.

Thus, wireless network node 120 may reconfigure BFR, e.g., with RRC, to allocate CFRA on a best spatial resource SSB/CSI-RS including uplink. In some embodiments, wireless network node 120 may schedule repetition of CSI instead of selecting new dedicated beam candidates for BFR and CFRA. As a fall back solution, wireless network node 120 may keep CFRA (or MAC-CE) BFR on the preferred SSB/CSI. Thus, use of random access may be avoided by using repetition of CSI before BFD. Wireless network node 120 may schedule the CSI repetition at the right time slot based on BFD duration, i.e., before BFD, upon MPE event and/or warning. Also, wireless network node 120 may schedule all wireless terminal in a cell and provide balance in the cell.

Figure 6:
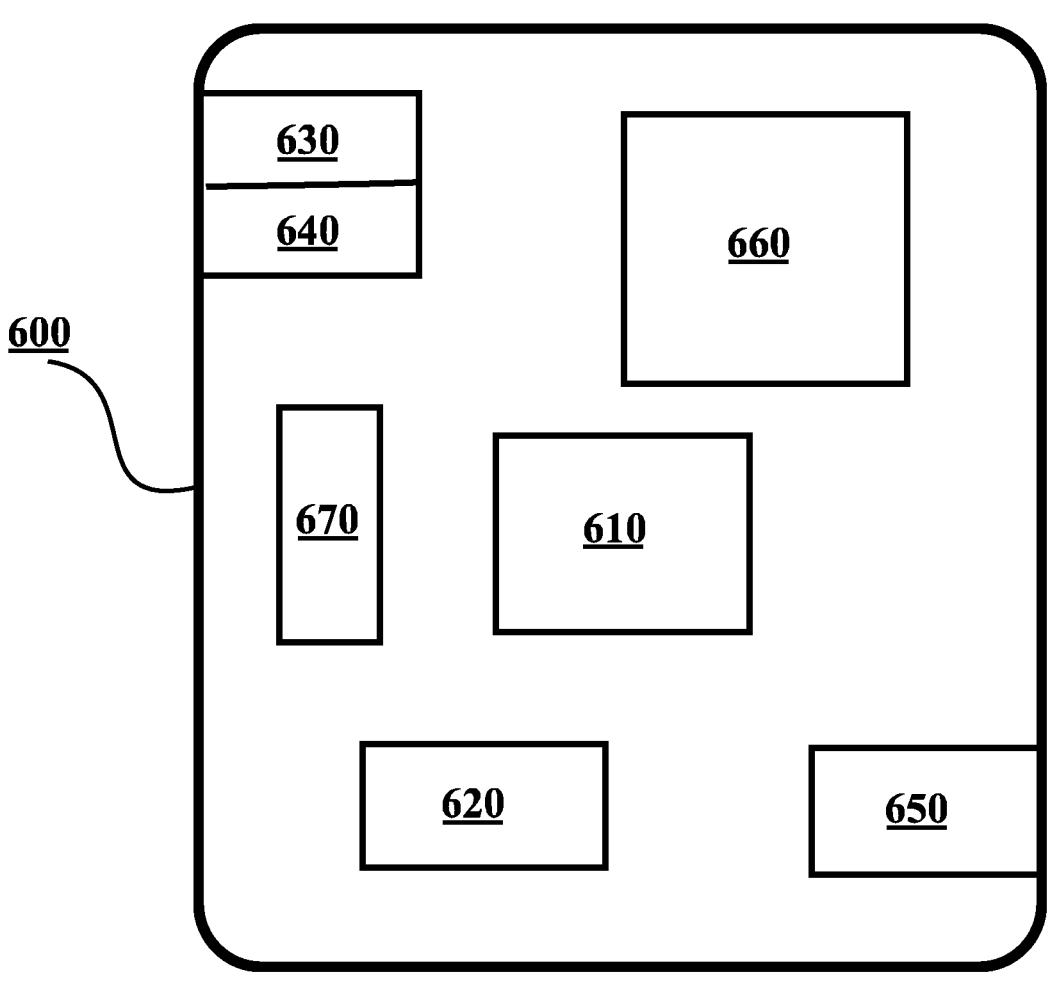
FIG. 6 illustrates an example apparatus capable of supporting at least some embodiments.

FIG. 6 illustrates an example apparatus capable of supporting at least some embodiments. Illustrated is device 600, which may comprise, for example, wireless terminal 110 or wireless network node 120, or a control device configured to control the functioning thereof, possibly when installed therein. Comprised in device 600 is processor 610, which may comprise, for example, a single- or multi-core processor wherein a single-core processor comprises one processing core and a multi-core processor comprises more than one processing core. Processor 610 may comprise, in general, a control device. Processor 610 may comprise more than one processor. Processor 610 may be a control device. A processing core may comprise, for example, a Cortex-A8 processing core manufactured by ARM Holdings or a Steamroller processing core produced by Advanced Micro Devices Corporation. Processor 610 may comprise at least one Qualcomm Snapdragon and/or Intel Atom processor. Processor 610 may comprise at least one application-specific integrated circuit, ASIC. Processor 610 may comprise at least one field-programmable gate array, FPGA. Processor 610 may be means for performing method steps in device 600. Processor 610 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 600 may comprise memory 620. Memory 620 may comprise random-access memory and/or permanent memory. Memory 620 may comprise at least one RAM chip. Memory 620 may comprise solid-state, magnetic, optical and/or holographic memory, for example. Memory 620 may be at least in part accessible to processor 610. Memory 620 may be at least in part comprised in processor 610. Memory 620 may be means for storing information. Memory 620 may comprise computer instructions that processor 610 is configured to execute. When computer instructions configured to cause processor 610 to perform certain actions are stored in memory 620, and device 600 overall is configured to run under the direction of processor 610 using computer instructions from memory 620, processor 610 and/or its at least one processing core may be considered to be configured to perform said certain actions. Memory 620 may be at least in part comprised in processor 610. Memory 620 may be at least in part external to device 600 but accessible to device 600.

Device 600 may comprise a transmitter 630. Device 600 may comprise a receiver 640. Transmitter 630 and receiver 640 may be configured to transmit and receive, respectively, information in accordance with at least one cellular or non-cellular standard. Transmitter 630 may comprise more than one transmitter. Receiver 640 may comprise more than one receiver. Transmitter 630 and/or receiver 640 may be configured to operate in accordance with Global System for Mobile communication, GSM, Wideband Code Division Multiple Access, WCDMA, Long Term Evolution, LTE, and/or 5G/NR standards, for example.

Device 600 may comprise a Near-Field Communication, NFC, transceiver 650. NFC transceiver 650 may support at least one NFC technology, such as Bluetooth, Wibree or similar technologies.

Device 600 may comprise User Interface, UI, 660. UI 660 may comprise at least one of a display, a keyboard, a touchscreen, a vibrator arranged to signal to a user by causing device 600 to vibrate, a speaker and a microphone. A user may be able to operate device 600 via UI 660, for example to accept incoming telephone calls, to originate telephone calls or video calls, to browse the Internet, to manage digital files stored in memory 620 or on a cloud accessible via transmitter 630 and receiver 640, or via NFC transceiver 650, and/or to play games.

Device 600 may comprise or be arranged to accept a user identity module 670. User identity module 670 may comprise, for example, a Subscriber Identity Module, SIM, card installable in device 600. A user identity module 670 may comprise information identifying a subscription of a user of device 600. A user identity module 670 may comprise cryptographic information usable to verify the identity of a user of device 600 and/or to facilitate encryption of communicated information and billing of the user of device 600 for communication effected via device 600.

Processor 610 may be furnished with a transmitter arranged to output information from processor 610, via electrical leads internal to device 600, to other devices comprised in device 600. Such a transmitter may comprise a serial bus transmitter arranged to, for example, output information via at least one electrical lead to memory 620 for storage therein. Alternatively to a serial bus, the transmitter may comprise a parallel bus transmitter. Likewise processor 610 may comprise a receiver arranged to receive information in processor 610, via electrical leads internal to device 600, from other devices comprised in device 600. Such a receiver may comprise a serial bus receiver arranged to, for example, receive information via at least one electrical lead from receiver 640 for processing in processor 610. Alternatively to a serial bus, the receiver may comprise a parallel bus receiver.

Device 600 may comprise further devices not illustrated in FIG. 6. For example, where device 600 comprises a smartphone, it may comprise at least one digital camera. Some devices 600 may comprise a back-facing camera and a front-facing camera, wherein the back-facing camera may be intended for digital photography and the front-facing camera for video telephony. Device 600 may comprise a fingerprint sensor arranged to authenticate, at least in part, a user of device 600. In some embodiments, device 600 lacks at least one device described above. For example, some devices 600 may lack a NFC transceiver 650 and/or user identity module 670.

Processor 610, memory 620, transmitter 630, receiver 640, NFC transceiver 650, UI 660 and/or user identity module 670 may be interconnected by electrical leads internal to device 600 in a multitude of different ways. For example, each of the aforementioned devices may be separately connected to a master bus internal to device 600, to allow for the devices to exchange information. However, as the skilled person will appreciate, this is only one example and depending on the embodiment various ways of interconnecting at least two of the aforementioned devices may be selected without departing from the scope of the embodiments.

FIG. 7 is a flow graph of a first method in accordance with at least some embodiments. The phases of the illustrated first method may be performed by wireless terminal 110 or by a control device configured to control the functioning thereof, possibly when installed therein.

The first method may comprise, at step 710, detecting a maximum permissible exposure event or that the maximum permissible exposure event is potential. The first method may also comprise, at step 720, determining at least one beam for a contention-free random access based beam failure recovery procedure, wherein the at least one beam is affected, or will be affected, by the maximum permissible exposure event. Finally, the first method may comprise, at step 730, transmitting to a wireless network node at least one indication about the at least one beam, preferably before detecting a beam failure.

FIG. 8 is a flow graph of a second method in accordance with at least some embodiments. The phases of the illustrated second method may be performed by wireless network node 120 or by a control device configured to control the functioning thereof, possibly when installed therein.

The second method may comprise, at step 810, receiving from a wireless terminal at least one indication about at least one beam, wherein the at least one beam is related to a contention-free random access based beam failure recovery procedure and affected, or to be affected, by a maximum permissible exposure event. The second method may also comprise, at step 820, transmitting to the wireless terminal a configuration for repetition of reference signals on at least one candidate beam and/or a reconfiguration for the contention-free random access based beam failure recovery procedure, wherein the configuration and/or the reconfiguration is based on the at least one indication.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an example embodiment, an apparatus, such as, for example, wireless terminal 110 or wireless network node 120, may comprise means for carrying out the embodiments described above and any combination thereof.

In an example embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an example embodiment, an apparatus, such as, for example, wireless terminal 110 or wireless network node 120, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in cellular communication networks, for example in 3GPP networks, wherein beamforming is used.

ACRONYMS LIST

3GPP 3rd Generation Partnership Project
BFD Beam Failure Detection
BFR Beam Failure Recovery
BS Base Station
CBRA Contention-Based Random Access
CFRA Contention-Free Random Access
CRI CSI-RS Resource Indicator
CSI-RS Channel State Information-Reference Signal
DU Distributed Unit
FCC Federal Communications Commission
GSM Global System for Mobile communication
IAB Integrated Access and Backhaul
IoT Internet of Things
LTE Long-Term Evolution
M2M Machine-to-Machine
MPE Maximum Permissible Exposure
MT Mobile Terminal
NFC Near-Field Communication
NR New Radio
P-MPR Power management-Maximum Power Reduction
PRACH Physical Random Access Channel
QCL Quasi Co-Location
RAN Radio Access Network
RAT Radio Access Technology
RRC Radio Resource Control
RSRP Reference Signal Receive Power
SSB Synchronization Signal Block
TRP Transmission and Reception Point
UE User Equipment
UI User Interface
WCDMA Wideband Code Division Multiple Access
WiMAX Worldwide Interoperability for Microwave Access
WLAN Wireless Local Area Network

REFERENCE SIGNS LIST

| | |
|---|---|
| 110 | Wireless terminal |
| 112, 114 | Beams |
| 120 | Wireless network node |
| 125, 135 | Wired interfaces |
| 130 | Core Network |
| 302-320 | Steps in the signaling graph of FIG. 3 |
| 402-416 | Steps in the signaling graph of FIG. 4 |
| 600-670 | Structure of the apparatus of FIG. 6 |
| 710-730 | Phases of the first method in FIG. 7 |
| 810-820 | Phases of the second method in FIG. 8 |

What is claimed is:

1. An apparatus, comprising:
at least one processor;
at least one memory including computer program code;
the at least one memory and the computer program code being configured to, with the at least one processor, cause the apparatus at least to:
detect a maximum permissible exposure event or a condition indicating that the maximum permissible exposure event would occur;

determine at least one beam, from a set of beams, configured for a contention-free random access based beam failure recovery procedure, wherein the at least one beam is affected or will be affected by the maximum permissible exposure event;
transmit, to a wireless network node, at least one indication that the at least one beam has been detected as unusable for the contention-free random access based beam failure recovery procedure due to the maximum permissible exposure event;
determine, upon detecting a beam failure, that none of beams in the set of beams is usable due to the maximum permissible exposure event; and
based on determining that no beams in the set of beams is usable, perform a contention-based random access procedure on a beam not in the set of beams without performing the contention-free random access based beam failure recovery procedure before the contention-based random access procedure.

2. The apparatus according to claim 1, wherein the at least one indication comprises a single-bit indication indicating that none of the beams in the set of beams is usable or at least one of the set of beams configured for the beam failure recovery procedure is usable.

3. The apparatus according to claim 1, wherein the at least one memory and the computer program code are further configured to, with the at least one processor, cause the apparatus at least to:
perform, upon detecting the beam failure, the beam failure recovery procedure on at least one candidate beam from the set of beams determined to be usable, excluding any beam detected as unusable for the beam failure recovery procedure.

4. The apparatus according to claim 1, wherein the at least one indication comprises an indication of at least one preferred candidate beam by the apparatus.

5. The apparatus according to claim 4, wherein the at least one memory and the computer program code are further configured to, with the at least one processor, cause the apparatus at least to:
receive, from the wireless network node in response to transmitting the indication of the at least one preferred candidate beam, a configuration for repetition of reference signals on the at least one preferred candidate beam; and
train, based on the repeated reference signals, a receiver of the apparatus to receive on the at least one preferred candidate beam.

6. The apparatus according to claim 1, wherein the at least one indication about the at least one beam is transmitted to the wireless network node before detecting the beam failure.

7. A method, comprising:
detecting a maximum permissible exposure event or a condition indicating that the maximum permissible exposure event would occur;
determining at least one beam, from a set of beams, configured for a contention-free random access based beam failure recovery procedure, wherein the at least one beam is affected or will be affected by the maximum permissible exposure event;
transmitting, to a wireless network node, at least one indication that the at least one beam has been detected as unusable for the contention-free random access based beam failure recovery procedure due to the maximum permissible exposure event;

determining, upon detecting a beam failure, that none of beams in the set of beams is usable due to the maximum permissible exposure event; and based on determining that no beams in the set of beams is usable, performing a contention-based random access procedure on a beam not in the set of beams without performing the contention-free random access based beam failure recovery procedure before the contention-based random access procedure.

8. The method according to claim 7, wherein the at least one indication comprises a single-bit indication indicating that none of the beams in the set of beams is usable or at least one of the set of beams configured for the beam failure recovery procedure is usable.

9. The method according to claim 7, wherein the method further comprises:

performing, upon detecting the beam failure, the beam failure recovery procedure on at least one candidate beam from the set of beams determined to be usable, excluding any beam detected as unusable for the beam failure recovery procedure.

10. The method according to claim 7, wherein the at least one indication comprises an indication of at least one preferred candidate beam.

11. The method according to claim 10, further comprising:

receiving, from the wireless network node, in response to transmitting the indication of the at least one preferred candidate beam, a configuration for repetition of reference signals on the at least one preferred candidate beam; and training, based on the repeated reference signals, a receiver to receive on the at least one preferred candidate beam.

* * * * *